Figure 3:
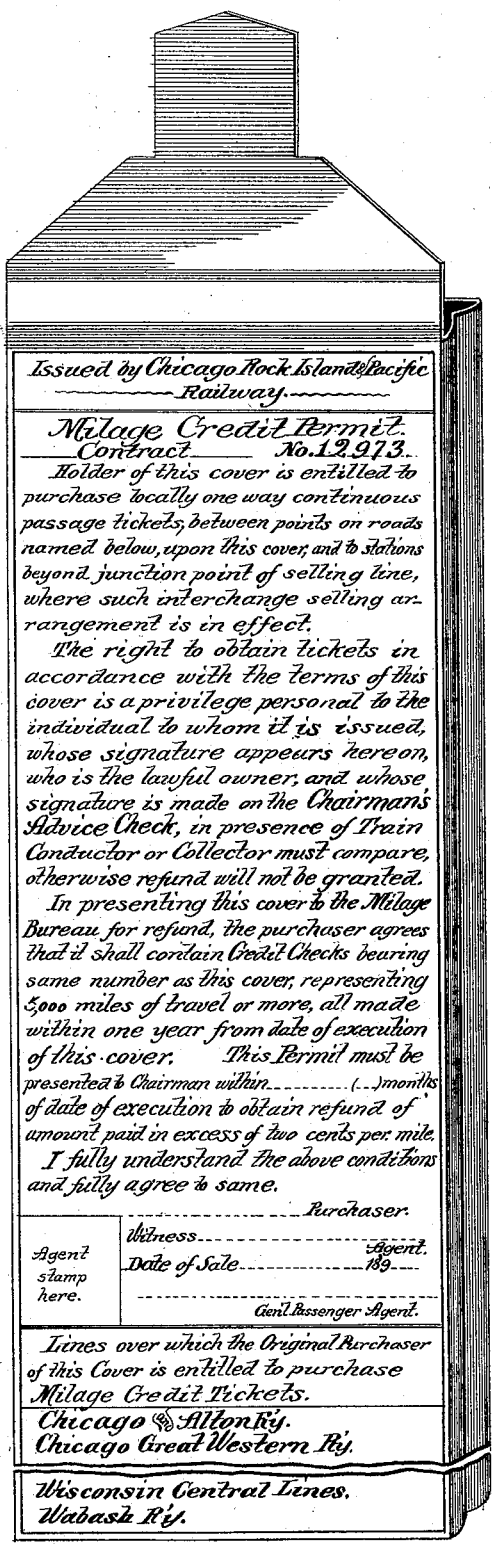

(No Model.) 3 Sheets—Sheet 1.

J. SEBASTIAN & B. B. ANDERSON.
RAILWAY TICKET.

No. 605,655. Patented June 14, 1898.

*Fig. 1.*

A —

Issued by the Chicago Rock Island & Pacific R'y.
*Milage Credit Ticket.*
Agent's Stub. Not good for Passage.
Chicago to ____ 7L ____ Miles
To be retained by the Agent for his Road.
via C.R.I.&P. B.C.R.&N. R'ys.
765 | Form 536 | Permit No. 12973 Rate ____

— B

Issued by the Chicago Rock Island & Pacific R'y.
B.C.R.&N. R'y.
*Milage Credit Ticket.*
Good for One First Class Continuous Passage.
West Liberty to ____ 7L ____ Miles
Milage Credit Permit No. 12973 Chicago to ____
765 | Form 536 | via C.R.I.&P. B.C.R.&N. R'ys.

— C

Issued by the Chicago Rock Island & Pacific R'y.
*Milage Credit Ticket.*
Good for One First Class Continuous Passage.
Chicago to West Liberty, Miles ____
Milage Credit Permit No. 12973
The Conductor will not honor this Ticket if the
Milage Bureau Record is Detached.
765 | Form 536 | via C.R.I.&P. B.C.R.&N. R'ys.

— C'

Issued by the Chicago Rock Island & Pacific R'y.
Milage Bureau Record. Not good for Passage.
Conductor will forward to the Auditor of the C.R.I.&P.R'y.
Chicago to ____ 7L ____ Miles ____
To be forwarded to the Chairman of the Western Passenger
Association. Agent will fill in space on the right,
the number of the Milage Credit Permit. | 12973
via C.R.I.&P. B.C.R.&N.
To be signed by the Purchaser in presence of the Conductor.
Purchaser ____
765 | Form 536 | Rate ____ Conductor.

— D

Issued by the Chicago Rock Island & Pacific R'y.
Credit Check Not good for Passage.
Chicago to ____ 7L ____ Miles ____
To be retained by purchaser presenting Milage Credit
Permit No. 12973, who is entitled to rebate of excess
over two cents per mile paid, upon presentation
of Credit Checks, bearing date within twelve months
from date of Permit, to amount of five thousand
miles or more.

— E

Witnesses:
Chas. E. Gaylord
Lille J. Hett

Inventors:
John Sebastian,
Benjamin B. Anderson,
By Dyrenforth and Dyrenforth,
Attys.

THE NORRIS PETERS CO., PHOTO-LITHO., WASHINGTON, D. C.

(No Model.) 3 Sheets—Sheet 2.

J. SEBASTIAN & B. B. ANDERSON.
RAILWAY TICKET.

No. 605,655. Patented June 14, 1898.

*Fig. 2.*

F

G — Issued by the Chicago Rock Island & Pacific Ry. From Y to Z Miles. Train Milage Credit Ticket. Milage Bureau Record — Not good for Passage. To be forwarded by Conductor to Auditor of the C.R.I.&P. Ry. Date____ Rate____ ____Purchaser. Conductor____ Form 987. Issued to holder of Milage Credit Permit No. 12923.

H — Issued by the Chicago Rock Island & Pacific Ry. From Y to Z Miles. Train Milage Credit Ticket. Good for Passage. To be forwarded by Conductor to Auditor of the C.R.I.&P. Ry. Date____ Rate____ ____Gen'l Passenger Agent. Form 987. Issued to holder of Milage Credit Permit No. 12973.

I — Issued by the Chicago Rock Island Pacific Ry. From Y to Z Miles. Date____ Rate____ Passengers Credit Check — Not good for Passage. To be retained by purchaser presenting Milage Credit Permit No. 12273, who is entitled to rebate of excess over two cents per mile paid, upon presentation of Credit Checks, bearing date within twelve months from date of Permit, to amount of five thousand miles or more.

Witnesses: Inventors:
John Sebastian,
Benjamin B. Anderson,
By Dyrenforth and Dyrenforth,
Att'ys (No Model.) 3 Sheets—Sheet 3.

J. SEBASTIAN & B. B. ANDERSON.
RAILWAY TICKET.

No. 605,655. Patented June 14, 1898.

UNITED STATES PATENT OFFICE.

JOHN SEBASTIAN AND BENJAMIN B. ANDERSON, OF CHICAGO, ILLINOIS.

RAILWAY-TICKET.

SPECIFICATION forming part of Letters Patent No. 605,655, dated June 14, 1898.

Application filed March 18, 1897. Serial No. 628,200. (No model.)

*To all whom it may concern:*

Be it known that we, JOHN SEBASTIAN and BENJAMIN B. ANDERSON, citizens of the United States, residing at Chicago, in the county of Cook and State of Illinois, have invented a new and useful Improvement in Railway-Tickets, of which the following is a specification.

The primary object of our invention is to provide as a substitute for the commonly-used mileage-ticket means whereby such ticket, with its attendant liability to scalping and other misuse, may be dispensed with.

A further object of our invention is to make provision whereby the benefits of reduced rates for long distances may be secured to the traveler without subjecting him to the inconvenience of investing a large amount of money in advance.

A still further object is to adapt to the exigencies of travel over connecting roads a ticket involving the feature of reduced rates for long distances—say one thousand to five thousand miles—thus providing what may be termed an "interchangeable" ticket—that is to say, a ticket which will be honored over any of the roads interested.

Our invention finds its widest application in its use as an interchangeable ticket, and its use in this connection is intended to be facilitated by the formation of a mileage bureau by the associating roads for the purpose of adjusting credits and charges, as hereinafter explained, and the objects of this bureau may be accomplished by organizations already in existence, such as the Western Passenger and similar associations.

We accomplish our purpose, preferably, by providing a special ticket to be sold at the usual or an agreed rate and having attached thereto purchaser's mileage-credit checks to be given to the purchaser, who, upon presentation to the proper authorities of checks certifying to the required amount of travel—45 say five thousand miles or more—is entitled to a rebate of the excess paid above an agreed rate.

As a safeguard against fraud in carrying out our invention we provide the additional features illustrated in the accompanying drawings, perhaps the most essential of which consists of what we term a "mileage-credit permit," having an identifying number, to be issued to any person upon request or at a nominal cost and entitling him to obtain the tickets of special form above mentioned. The holder, upon presentation of this permit to any ticket agent of the interested road or roads and tender of the required fare, is entitled to one of these tickets. The ticket, when issued, is given the same number as the permit, and thus all the tickets issued on any permit are identified.

The invention in its preferred form is hereinafter more specifically described with reference to the accompanying drawings, in which—

Figure 1 represents a face view of our novel mileage-credit coupon-ticket for use over two connecting railways and designed to be placed in the hands of the various ticket agents; Fig. 2, a similar view of our form of ticket designed to be placed in the hands of railway-conductors for use in carrying out the system contemplated by this invention; and Fig. 3, a view in perspective of what we term a "mileage-credit permit," which is arranged, preferably, in the form of an envelop, book, or other suitable holder.

The ticket here shown is one from Chicago to any point Z upon the Burlington, Cedar Rapids, and Northern railway via the Chicago, Rock Island, and Pacific railway.

A represents the preferred form of ticket supplied to selling agents, it being understood that a coupon-ticket is shown merely for descriptive purposes, and that the novel features here shown may be applied as readily to a local ticket. The ticket A comprises an agent's stub B, detachable passage-coupons C and C', what we term a "mileage-bureau record-coupon" D, which in a local ticket would be termed a "company's record-coupon," and a purchaser's mileage-credit check E, the coupons D and E being also detachable.

In Fig. 2, F represents a train mileage-credit ticket designed to be placed in the hands of conductors for use where passengers are taken on at stations having no local agents and where, consequently, the passenger would be unable to procure the ticket A. The ticket F comprises a mileage-bureau record-coupon G, a passage-coupon H, and a passenger's mileage-credit check I.

Fig. 3 shows in perspective a mileage-credit permit represented in the form of a pocket or envelop. The permit has printed upon it the necessary terms of contract, purchaser's signature-blank, list of lines over which the permit is good, and a characterizing or identifying mark or number. It may be provided, further, with a blank space upon which to enable the holder of the ticket to note, from time to time, the miles, rates, &c., shown by the various mileage-credit checks, thus affording a concise record of the same. This feature is not of great importance, however, and is not shown in the drawings, because it would tend to amplify the latter unnecessarily. These permits are obtainable at the various railroad offices by the general public and in case of an association of roads may be issued only through the mileage-bureau hereinbefore referred to. Our tickets are supplied upon each of their coupons or checks with blanks to receive the number of the permit with which they chance to be used and also with miles and rate-blanks.

In the drawings the mileage-bureau record-coupon is shown provided with a purchaser's signature-blank. It is absolutely essential in practice that the coupons constituting the check against fraudulent manipulation, or at least one of them, be provided with a place for the purchaser's signature for the purpose of proper identification, as by comparison of the signature thereon obtained with the contract signature.

We will suppose that a person wishes to go from Chicago to a point Z upon the B., C. R. & N. via the C., R. I. & P. and B., C. R. & N. railways. The various ticket-offices of the interested road or roads are supplied with consecutively-numbered mileage-credit permits or holders and with the tickets of special form adapted to use in connection with them. The prospective passenger accordingly presents himself at the Chicago office of the C., R. I. & P., and, if he has not already done so, obtains one of these permits by signing the contract upon it. Upon presentation of the permit to the ticket agent and payment of the ordinary or full fare the purchaser may obtain one of these special tickets to any point on the lines interested. The ticket agent fills in the permit number upon the blanks provided therefor upon the special ticket (in the present instance shown as 12,973) the destination, station, miles, &c., and retains his stub B. In filling in this data the passenger's mileage-credit coupon and the bureau-record coupon become supplied with sufficient marking to indicate, preferably of themselves, but otherwise through their identification with the other portions of the ticket, the amount of rebate to which the passenger is entitled. In other words, these coupons finally become what may be properly termed a "passenger's credit-coupon" and a "company or mileage-bureau credit-record coupon," each supplied with intelligible markings from which to determine the amount of the rebate. When the ticket is presented for passage, the conductor requires the passenger to sign the mileage-bureau record-coupon D, which the conductor also signs and forwards to the auditor of the issuing line, C., R. I. & P. The credit-check E he hands to the passenger, who for convenience in keeping these checks is supplied with a permit in the form of a book or envelop. Where the ticket is an interchangeable one, as in this instance, the auditor of the issuing line upon receipt of the coupon D forwards the same to the chairman, say, of the mileage bureau which the interested roads have formed, who from time to time requires the various roads to remit their portions of the rebate which is allowed to the passenger. Continuing now with the ticket, the last conductor of the issuing line takes up the passage-coupon C' for his road and forwards it to his auditor, who retains it as his record of the ticket. Finally the coupon C is taken up by the last conductor of the destination line and forwarded to his auditor for his record.

It will be seen that this ticket may be extended readily to embrace any number of roads or may be used by one road alone.

The ticket F, as hereinbefore suggested, is to be used when a passenger is taken on at a station not having a ticket agent and is an important part of this invention only in extending the system which it enables to be carried out to possible exigencies which may arise, and therefore it is to be understood that we do not intend that our invention shall be limited to this feature, except where we claim it in combination with the features already described. The method of using is similar to that hereinbefore explained with reference to the ticket A, except that in this instance it has not been deemed necessary to supply a conductor's stub corresponding with the agent's stub B.

It will be apparent that our improvement is of great value to mercantile establishments having a large number of commercial travelers upon the road whose traveling expenses are borne by the house. In such a case the house may require its men to forward daily their mileage-credit coupons and in this way would be able to keep a check upon its men and their traveling expenses. This would obviate the possibility of collusion between the traveling man and conductor and save money to both railroads and commercial houses.

When credit-checks to the amount agreed upon are accumulated by the purchaser, he may send his permit-book and mileage-credit checks to the issuing road, or in case of an interchangeable ticket, if desired, to the mileage bureau of the associated roads, and if the checks show the proper signature and tally with the record already in the hands of the company or companies the purchaser is entitled to the agreed rebate.

To enable the utility of our improvement to be clearly understood, it has been thought necessary to describe quite extensively the system for practicing which we devised and the exact details of the ticket.

While the ticket as shown is believed to be the best form thereof in all its details for our purpose, it may be variously modified without omitting its essential elements, and therefore without departure from our invention.

We desire it to be understood, as already indicated above, that the special form of ticket spoken of, while of great advantage, is not indispensable, certain features of our invention being applicable with great advantage to any ordinary form of ticket. For instance, the feature of the mileage-credit permit used in connection with the passenger's mileage-credit check and the mileage-bureau record-check or some coupons corresponding thereto may still be preserved, even though the special form of ticket described herein be dispensed with, and these features be used in connection with the ordinary ticket, though not necessarily forming an integral part thereof, and such a combination would be within the spirit of our invention and, indeed, would involve one of its most valuable features.

What we claim as new, and desire to secure by Letters Patent, is—

1. The herein-described substitute for a mileage-ticket, comprising a mileage-credit permit and a mileage-credit ticket mutually identified by corresponding characters, substantially as and for the purpose set forth.

2. A substitute for mileage-tickets, comprising a mileage-credit permit, and a ticket provided with a passenger's mileage-credit check and a company's mileage-record check, said ticket and checks being provided with a number or the like identifying them with said permit, substantially as and for the purpose set forth.

3. The combination with a railway-ticket, of a passenger's mileage-credit check and a company's mileage-credit record-check, said checks being mutually identified by corresponding characters and one of said checks, at least, being provided with markings from which to determine the amount of credit or rebate and with a purchaser's signature-blank whereon is required the purchaser's signature for prevention of fraudulent manipulation, substantially as and for the purpose set forth.

4. An interchangeable mileage-credit ticket, comprising passage-coupons over the several roads, a passenger's mileage-credit check, and a mileage-bureau credit-record check, said checks being mutually identified by corresponding characters and one of said checks at least provided with markings from which to determine the amount of credit or rebate and with a purchaser's signature-blank, substantially as and for the purpose set forth.

5. The combination with a railway-ticket, of a mileage-credit permit, and a passenger's mileage-credit check, substantially as and for the purpose set forth.

6. The combination with a railway-ticket, of a mileage-credit permit and a mileage-bureau record-check, substantially as and for the purpose set forth.

7. The combination with a railway-ticket, of a mileage-credit permit, a mileage-bureau record-check, and a passenger's mileage-credit check, substantially as and for the purpose set forth.

JOHN SEBASTIAN.
BENJAMIN B. ANDERSON.

In presence of—
J. H. LEE,
RICHARD SPENCER.